United States Patent
Pini

(12) United States Patent (10) Patent No.: US 7,417,190 B2
Pini (45) Date of Patent: Aug. 26, 2008

(54) CASING FOR ELECTRIC CONNECTIONS AND PROCESS FOR MANUFACTURING SUCH A CASING

(76) Inventor: Belisario Pini, Via U. Corsi 26, Firenze (IT)

( * ) Notice: Subject to any disclaimer, the term of this patent is extended or adjusted under 35 U.S.C. 154(b) by 0 days.

(21) Appl. No.: 11/463,419

(22) Filed: Aug. 9, 2006

(65) Prior Publication Data
US 2007/0049109 A1    Mar. 1, 2007

(30) Foreign Application Priority Data
Aug. 31, 2005    (IT)    .............................. FI2005A0185

(51) Int. Cl.
H01R 4/00     (2006.01)
H02G 3/06     (2006.01)
H02G 15/08    (2006.01)

(52) U.S. Cl. ......................................... 174/92; 174/76

(58) Field of Classification Search ................... 174/92, 174/76, 59, 88 R; 439/521, 936
See application file for complete search history.

(56) References Cited

U.S. PATENT DOCUMENTS 6,333,463 B1 * 12/2001 Bukovnik et al. ......... 174/77 R

* cited by examiner

*Primary Examiner*—Javaid Nasri
(74) *Attorney, Agent, or Firm*—McGlew & Tuttle, P.C.

(57) ABSTRACT

Casing for electric connections comprising two elements (1,1'; 100,102; 200, 201) which can be reciprocally coupled in a reversible or irreversible manner and delimiting an internal cavity (2; 101; 210) for a terminal box (3) or similar device and a plurality of in/out openings for one or more cables (5) which can be connected to the terminal box (3) or similar device. The internal space of at least one of said elements (1,1'; 100,102; 200, 201) is filled with dielectric gel (G) which occupies said space before the positioning of the terminal box (3) or similar device into said cavity (2; 101; 210), that is to say it is provided with a predetermined quantity of dielectric gel (G) which occupies its internal space.

11 Claims, 15 Drawing Sheets

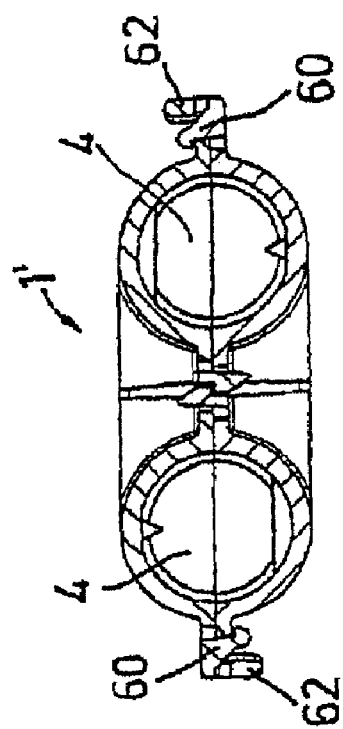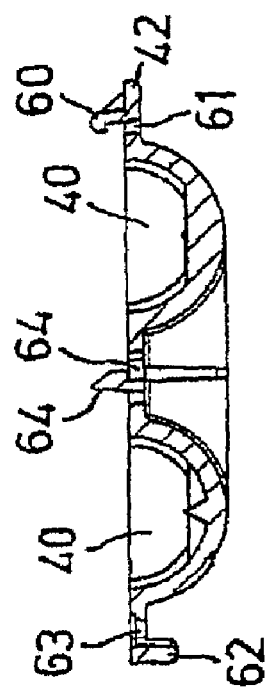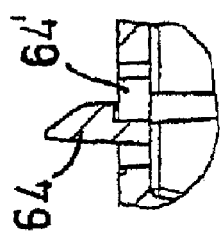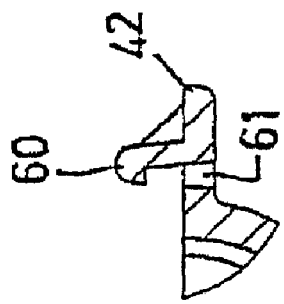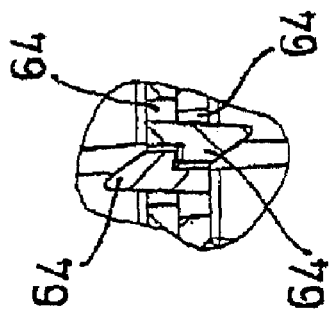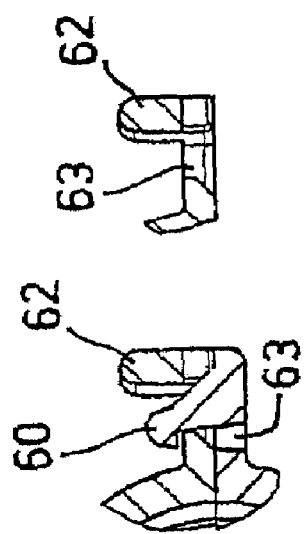

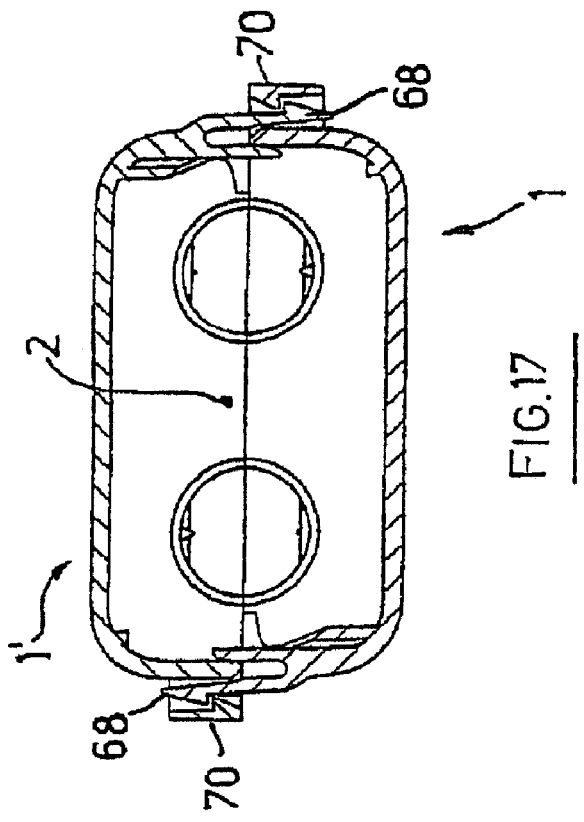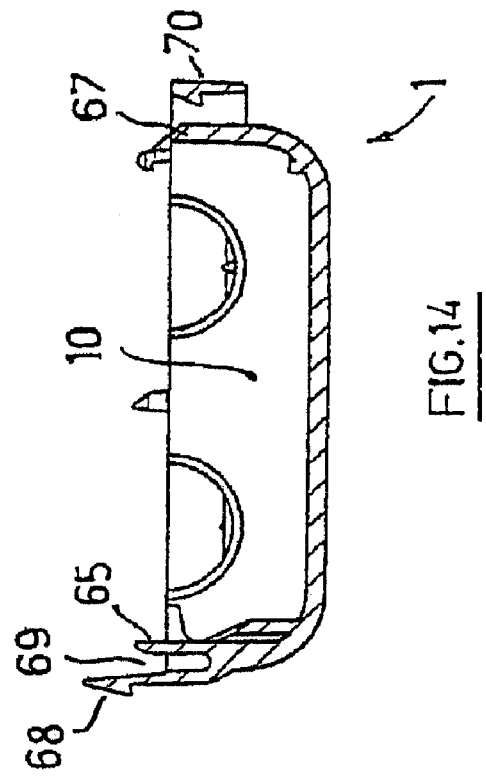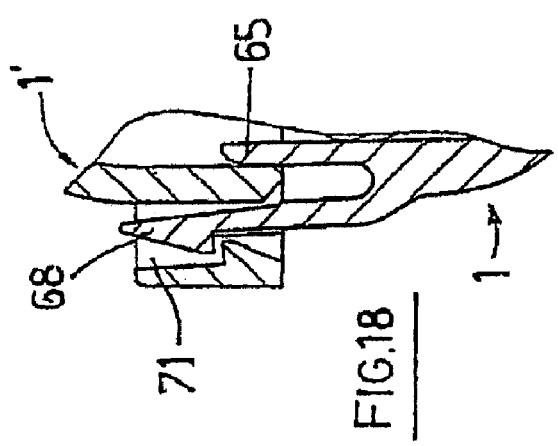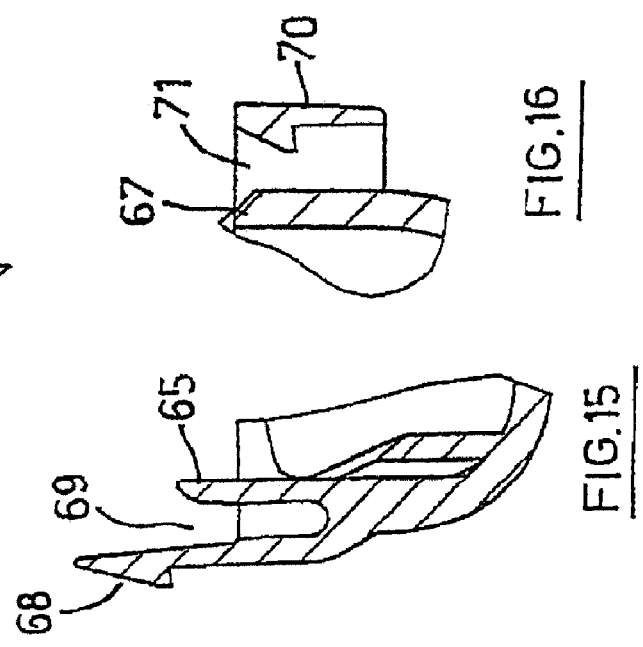

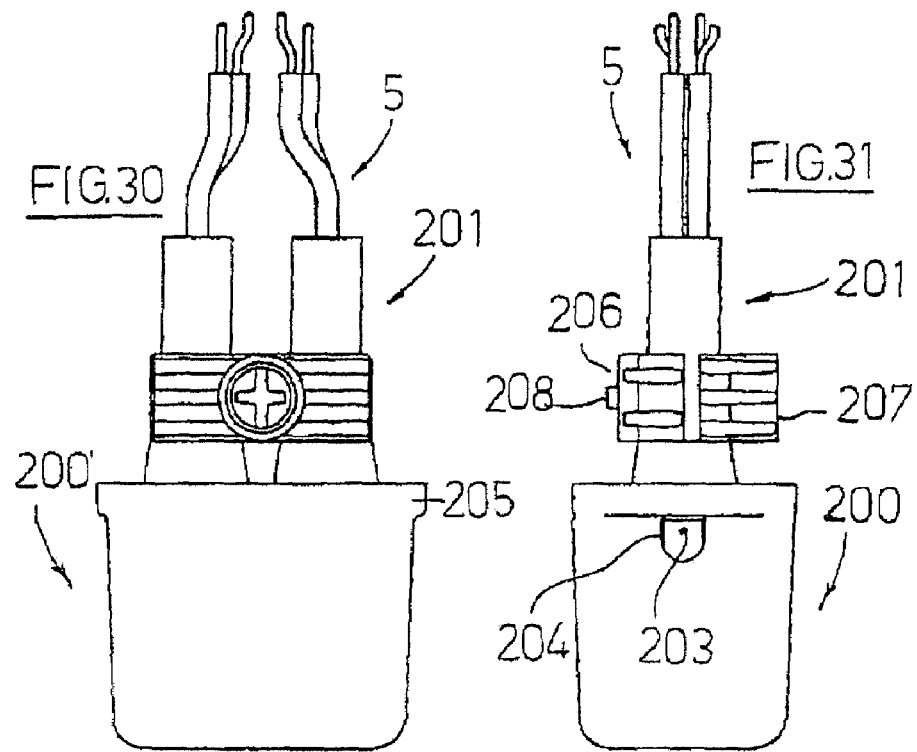
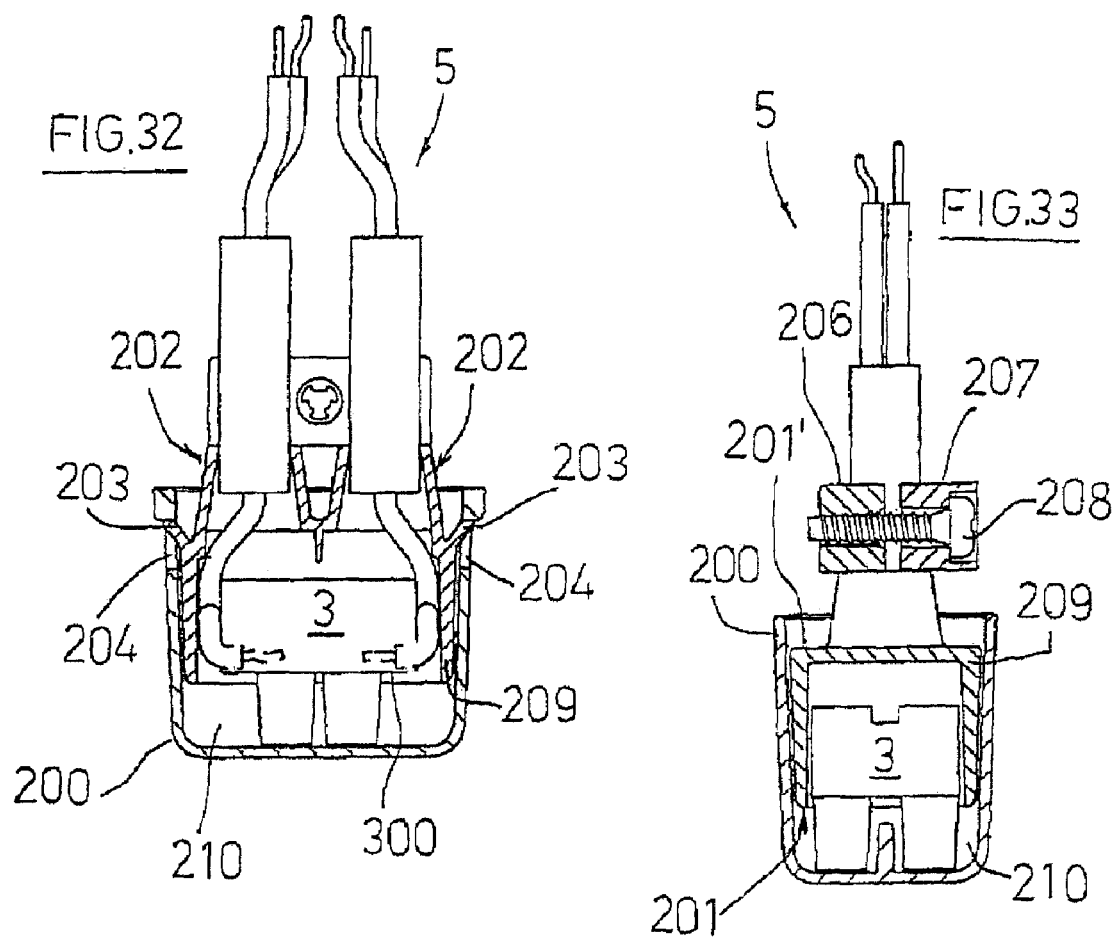

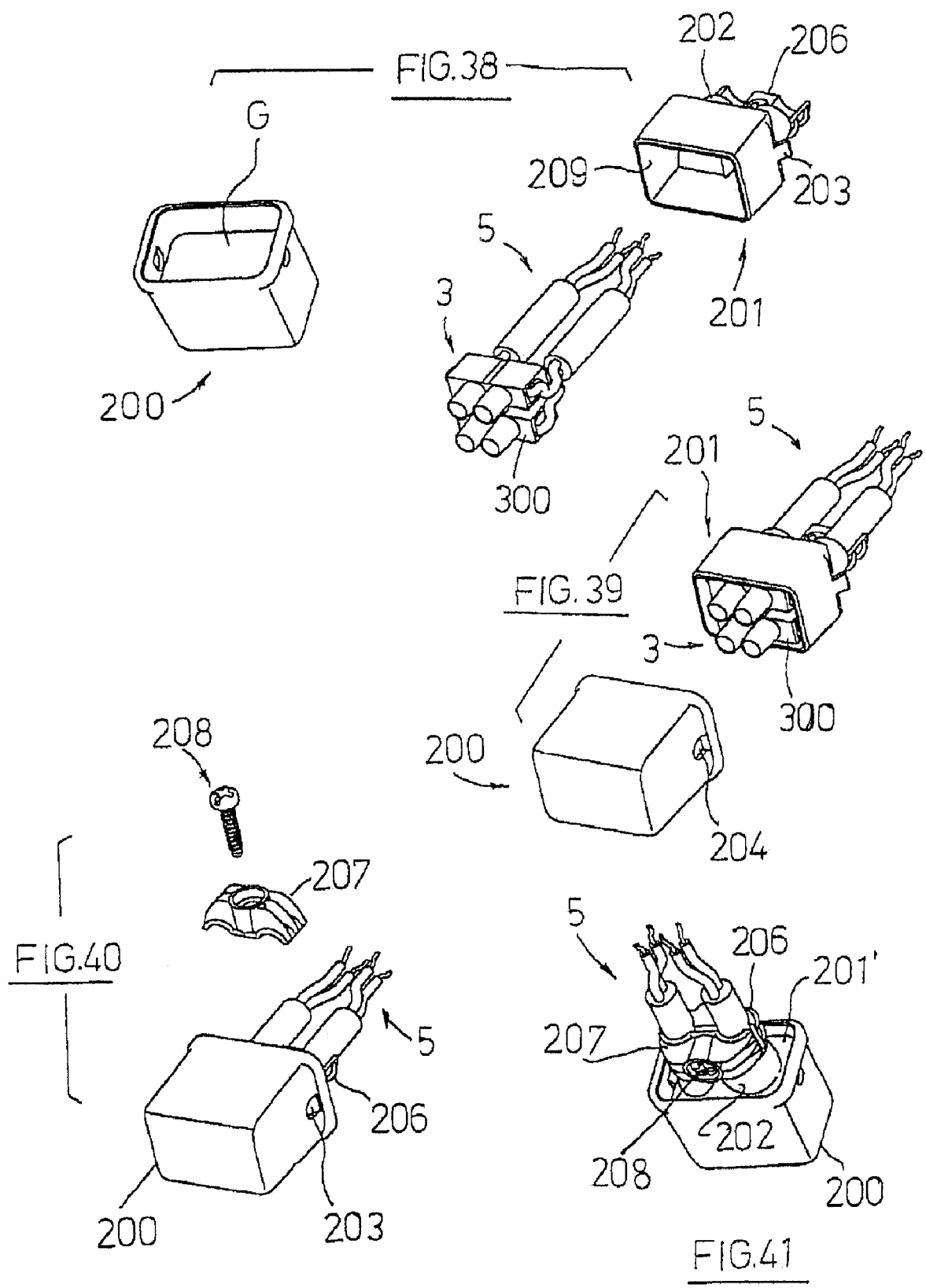

CASING FOR ELECTRIC CONNECTIONS AND PROCESS FOR MANUFACTURING SUCH A CASING

The present invention relates to a casing for electric connections and to a process for manufacturing such a casing.

More particularly, the present invention aims at simplifying the execution of junctions or connections of electric cables protected by the action of liquid substances or vapours in order to render them more efficient, safer and easier to execute.

According to the present invention, these results have been achieved by providing a casing and carrying out a process whose features are indicated in the independent claims. Further features of the present invention are the subject of the dependent claims.

The present invention makes it possible to realize a water and vapours tight casing for electric connections which is very simple, safe, efficient and reliable, even after long periods in environments characterized by the presence of liquids and vapours and, at the same time, it ensures reduced manufacturing costs and is easy to use.

These and other advantages and characteristics of the invention will be best understood by anyone skilled in the art from a reading of the following description in conjunction with the attached drawings given as a practical exemplification of the invention, but not to be considered in a limitative sense.

BRIEF DESCRIPTION OF THE DRAWINGS

FIG. 7 is a transverse section view taken in proximity to one of the two ends of the half shell of FIG. 3;

FIG. 8 is an enlarged detail of FIG. 7;

FIG. 9 is another enlarged detail of FIG. 7;

FIG. 10 is a transverse section view taken in proximity to one of the two ends of two half shells coupled to each other;

FIGS. 11, 12 and 13 are three different enlarged details of FIG. 10;

FIG. 14 is a median transverse section view of the half shell of FIG. 3;

FIGS. 15 and 16 are two different enlarged details of FIG. 14;

FIG. 17 is a median transverse section view of two half shells coupled to each other;

FIG. 18 is an enlarged detail of FIG. 17

FIG. 30 is a front view of a casing according to yet another embodiment of the present invention;

FIG. 31 is a side view of the casing shown in FIG. 30;

FIG. 32 is a vertical section view of the casing shown in FIG. 30;

FIG. 33 is a vertical section view of the casing shown in FIG. 31;

FIGS. 38-41 illustrate the assembling of the casing shown in FIG. 30.

DETAILED DESCRIPTION OF THE ILLUSTRATED EMBODIMENTS

Figure 1:
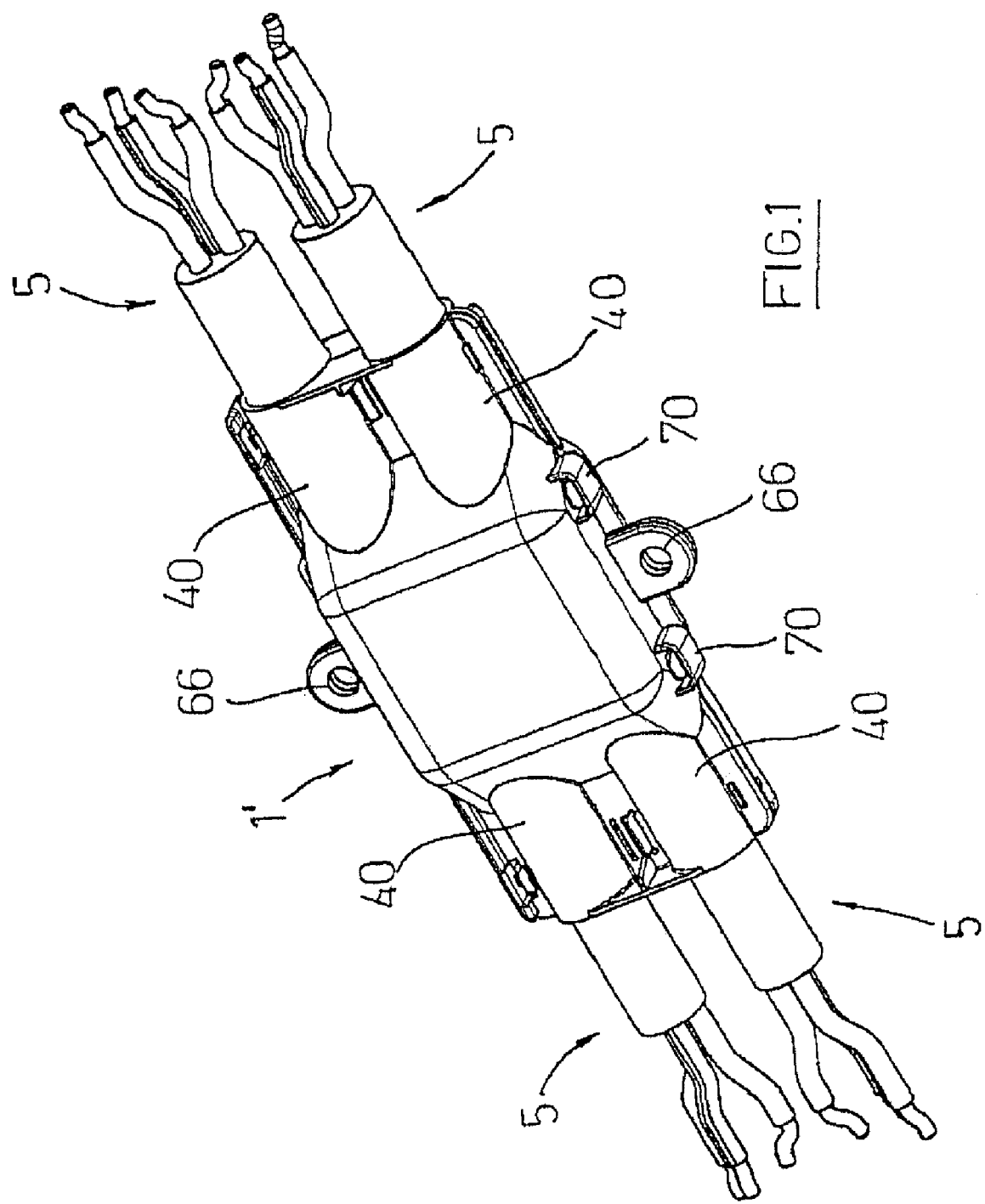
FIG. 1 is a perspective view of a casing for electric connections according to a possible embodiment of the present invention.

Reduced to its essential structure and with reference to FIGS. 1-18 and 21 of the enclosed drawings, a casing for electric connections according to the invention comprises two half shells (1,1') which, in cooperation with each other, define a seat (2) for a terminal box (3) or similar device and a plurality of channel-shaped holes (4) for corresponding input and output electric cables (5) connected to the terminal box (3).

The two half shells (1,1') are identical to each other and in practice, they respectively constitute a base (1) and a cover (1') of the casing.

Evident advantages arise from the fact that said half shells are identical, both in economical terms as concerns their production and distribution on the market, and in practical terms, when employing this product.

Each of said half shells (1,1') has a central depression (10) and a plurality of semi-cylindrical depressions (40) provided between the central depression (10) and a corresponding end or head (41). Said semi-cylindrical depressions (40), which are four in the enclosed illustrating drawings, form two couples of depressions on each front (F) of the half shell. Each depression (40) is parallel to the respective adjacent depression (40) and is coaxial to a depression (40) of the opposite face. Moreover, each depression (40) is provided in correspondence of a wing (42) which is united to the bottom of the central depression (10) by means of a ramp (42) made of the same moulding material of the half shell. Each of the above mentioned heads (41) is connected to the respective wing (42) of the half shell by a thin, that is to say weak, line (44) of the moulding material, so as to allow—as better disclosed below—its easy removal even by using hands only.

When the two half shells (1,1') are superimposed, they form a housing for the terminal box (3) and the channel-shaped holes (4) for the cables (5).

At the bottom of depression (10) of each of said half shells (1,1') a plurality of appendixes (11) emerge to guide the positioning of terminal box (3).

In the examples, said appendixes (11) emerge perpendicularly from the bottom of depression (10). Moreover, semi-cylindrical depressions (40) are provided with a plurality of internal extensions (45) which are intended to clamp the cables (5) when the two half shells are coupled after positioning of the terminal box (3).

Figure 6:
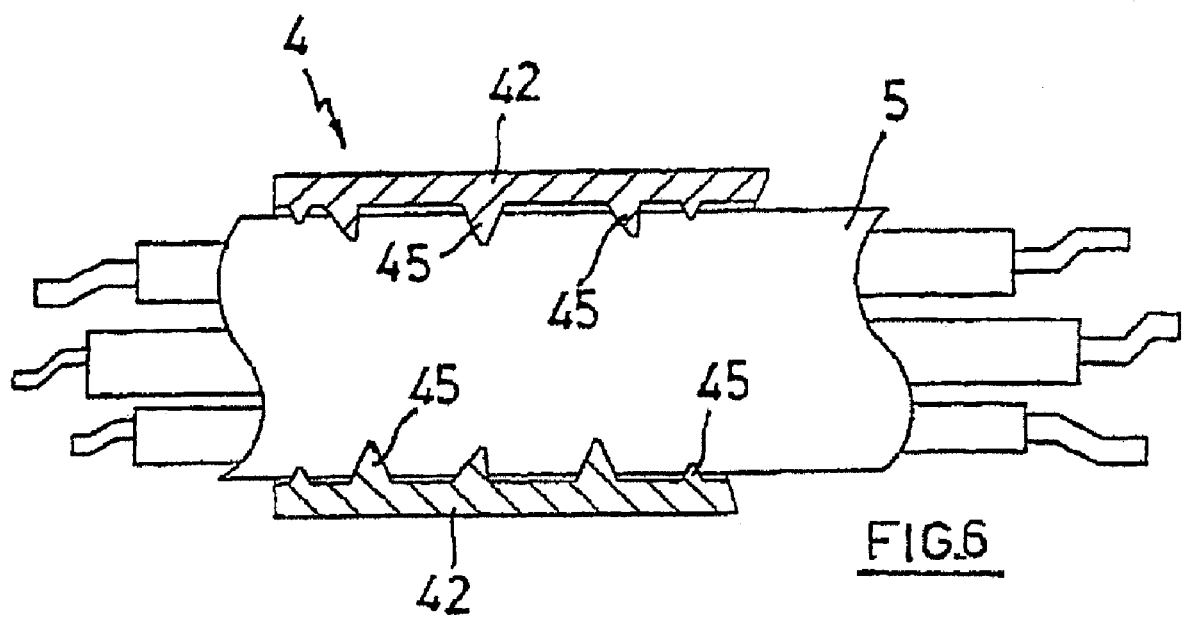
FIG. 6 is a longitudinal section view of a detail of the casing shown in FIG. 1.

In practice said extensions consist of a series of teeth which, when half shells (1,1') are coupled, are respectively placed exactly opposite to one another within each channel-shaped hole (4), as illustrated in the detail of FIG. 6, and clamp cable to prevent it to escape if subject to traction.

Said half shells (1,1') are equipped with means allowing their reciprocal coupling. More particularly, with reference to the example illustrated by FIGS. 1-18, each wing (42) of each of the two half shells (1,1') features an upwards oriented hooked extension (60) on the external side of respective semi-cylindrical depressions (40). In proximity to the base of said extension (60) a passage hole (61) is provided between extension (61) and the corresponding semi-cylindrical depression (40). On the opposite side, the same wing (42) features an extension (62) downwards oriented which exhibits a passage hole (63) between the extension (62) and the corresponding semi-cylindrical depression (40). Moreover, at a point between the two semi-cylindrical depressions (40), the wing (42) features another upwards oriented hooked extension (64) on whose base a passage hole (64') is provided.

A lateral edge (65) of depression (10) is higher than the other one (67) and features two hooked extensions (68) positioned at a predetermined distance from each other and from the edge itself (65) so that a corresponding pocket (69) is provided between each extension (68) and the lateral edge (65). The lower lateral edge (67) features two external eye-lets (70) provided with funnel shaped openings (71).

When the two half shells (1,1') are coupled to each other, what is shown in FIG. 10 and in the details of FIG. 11 and FIG. 12 takes place in proximity to the two faces (F): extensions (64) of half shell (1) are positioned inside holes (65) of half shell (1') and vice-versa, while extensions (60) of half shell (1) are in holes (63) of half shell (1') and vice-versa. Moreover, what is shown in FIG. 17 and in the detail of FIG. 18 takes place in proximity to depressions (10): extensions (68) of half shell (1) are housed inside eye-lets (70) of half shell (1') and vice-versa, while raised edge (65) of half shell (1) is inserted in pockets (69) of half shell (1') and vice-versa. On account of the hooked shape of said extensions (60,64 and 68) and on account of the structure and arrangement of holes (63) and of eye-lets (70), the coupling of the two half shells (1,1') is irreversible.

The two half shells (1,1') can be made in plastic material suitable for series moulding, for example Nylon PA 6.6.

Figure 2:
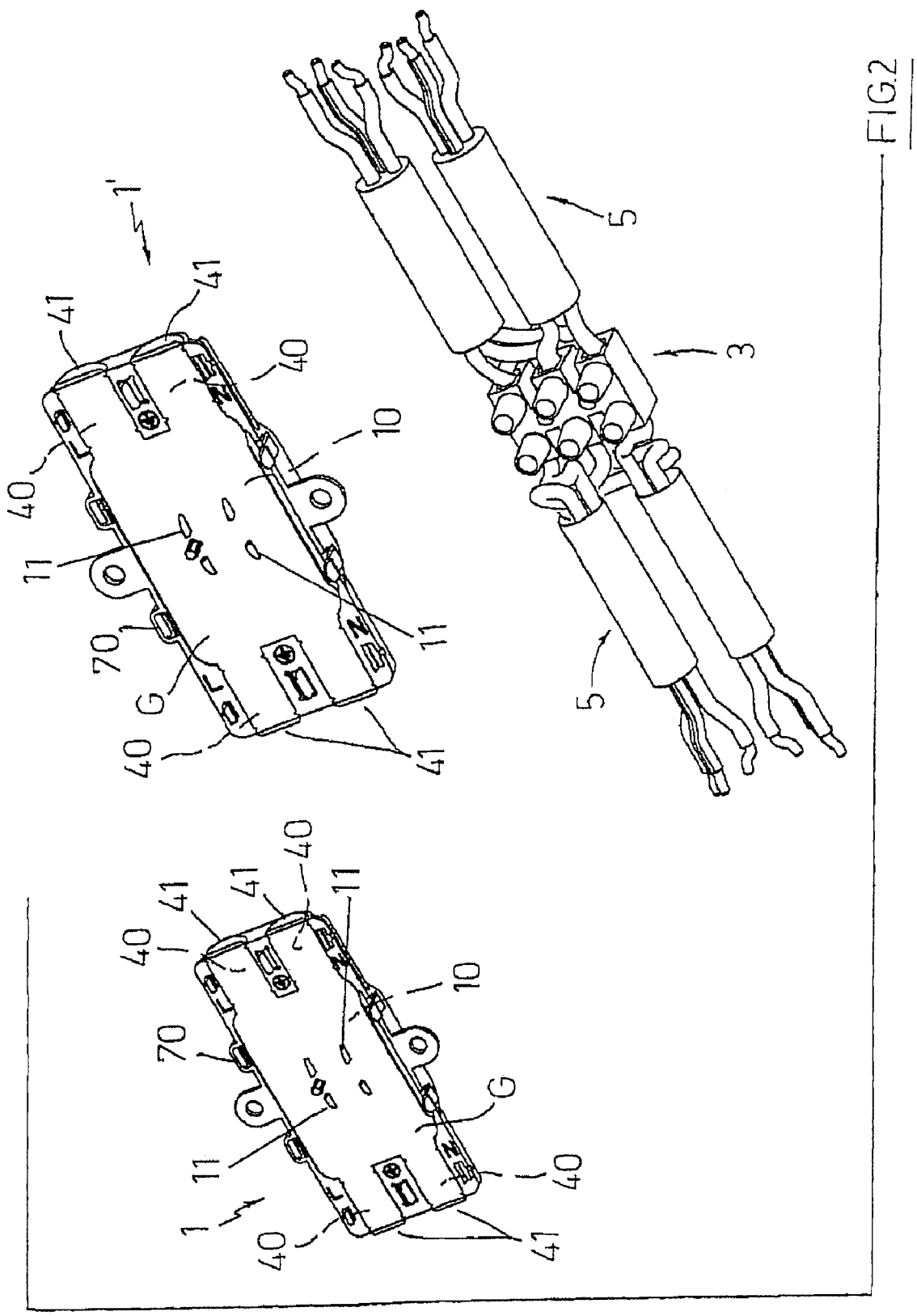
FIG. 2 is a perspective exploded view of the casing shown in FIG. 1.
Figure 3:
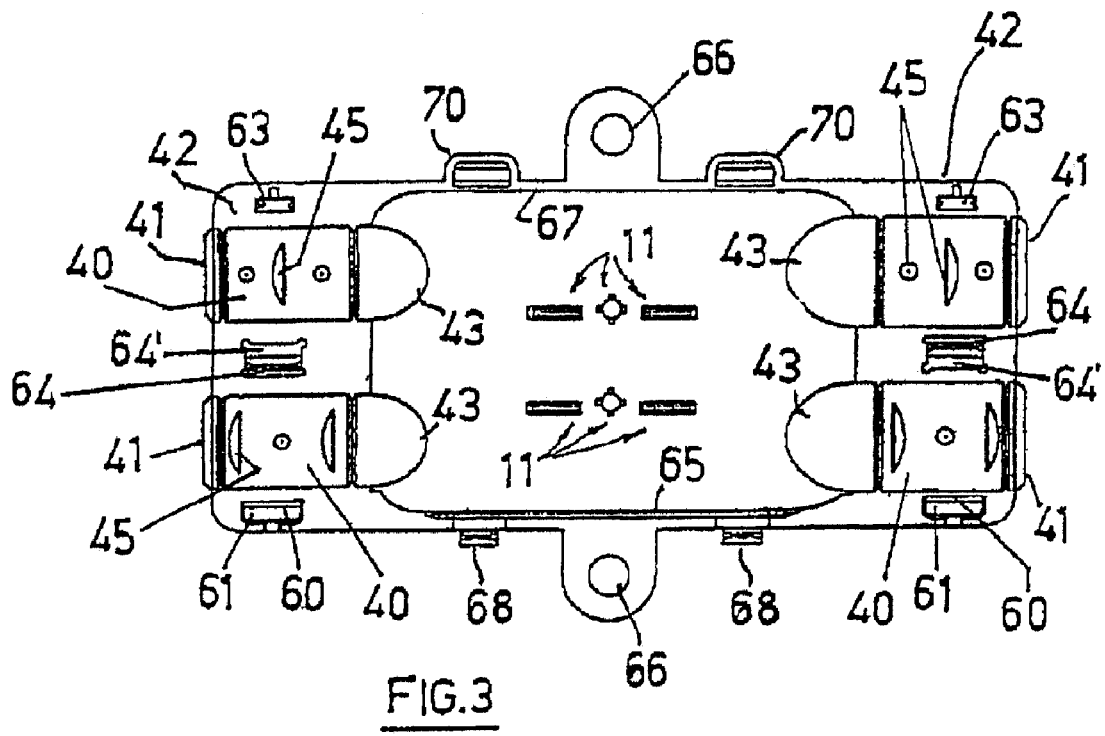
FIG. 3 is a plan top view of one of the two half shells forming the casing of FIG. 1.
Figure 4:
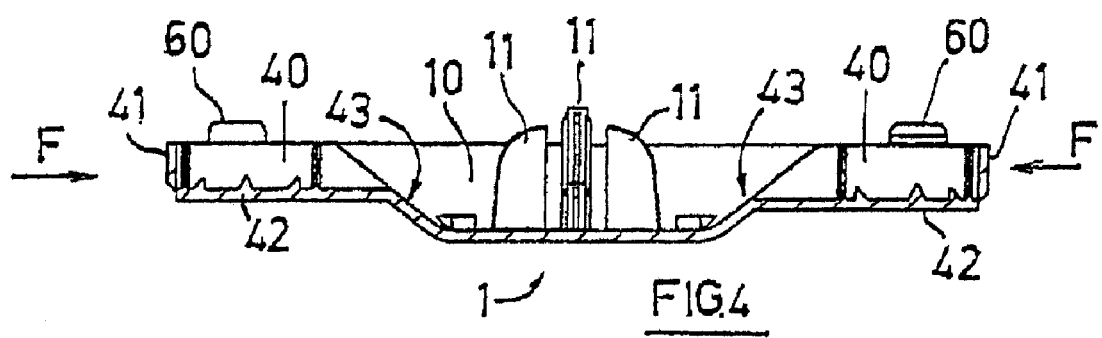
FIG. 4 is a longitudinal section view of the half shell shown in FIG. 3.
Figure 5:
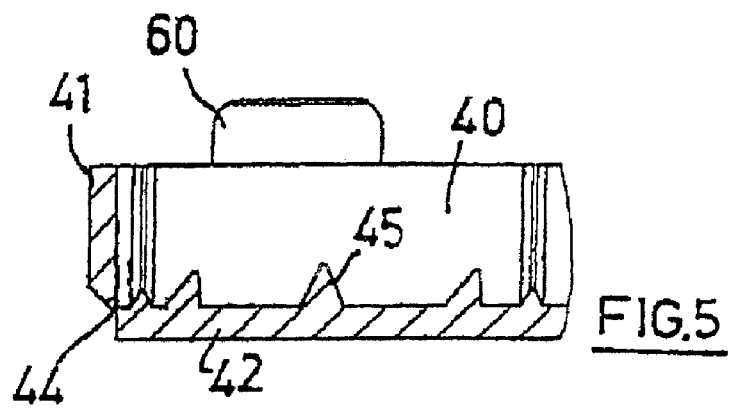
FIG. 5 is an enlarged detail of FIG. 4.

The internal space of each of said half shells (1,1') is filled with dielectric gel, as shown in FIG. 2, where white region (G) represents the gel filling cavities (10) and (40) up to the level of lateral edge (67) which is lower than cavity (10). Fox example, dielectric gel (G) can be of the Dow Corning Q3-6575 type, that is to say of the bi-component type which slowly polymerizes at ambient temperature or of the bi-component type which fast polymerizes at high temperatures.

Preferably, gel (G) is of the hot polymerized type, polymerizing at a temperature of 100°.

Figure 20:
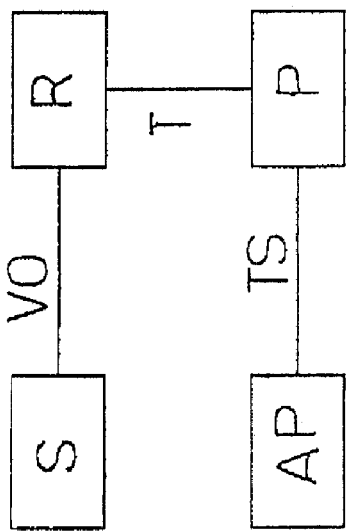
FIG. 20 is a simplified block diagram illustrating the steps of a process for manufacturing a casing according to the present invention.
Figure 21:
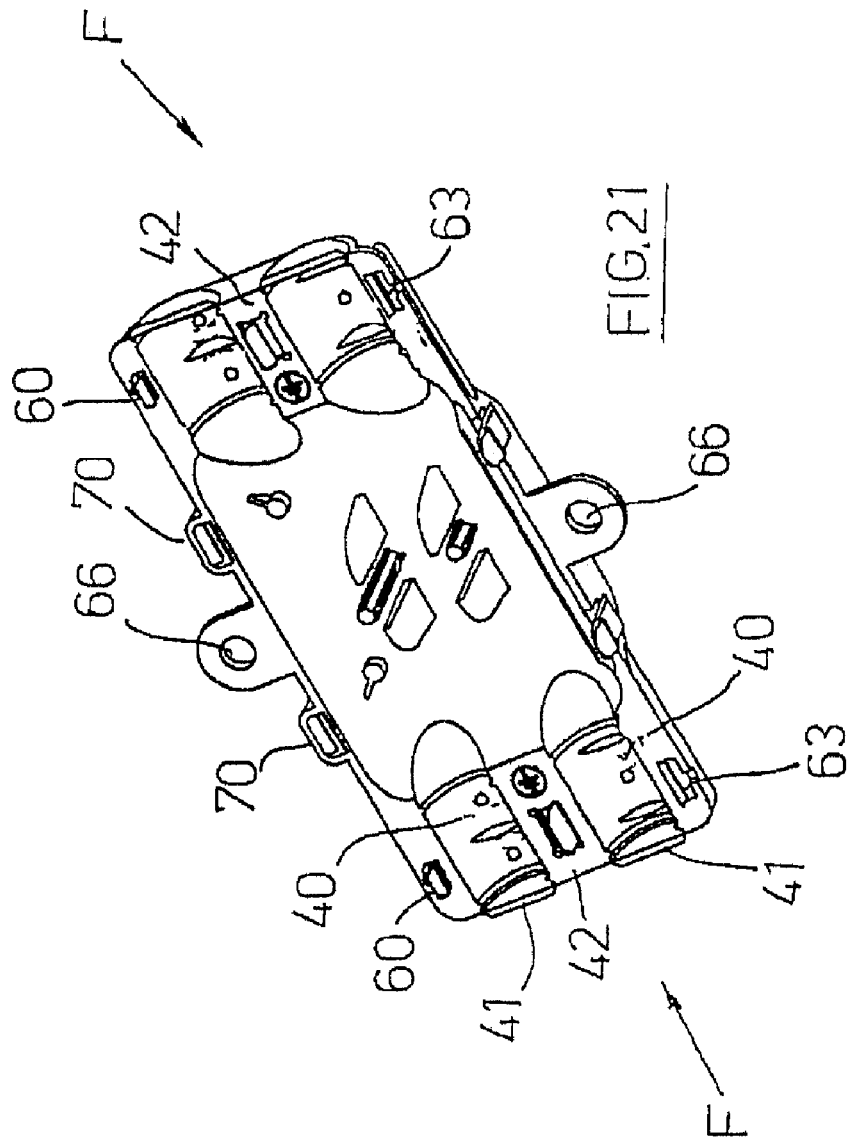
FIG. 21 shows a perspective view of an empty half shell.
Figure 22:
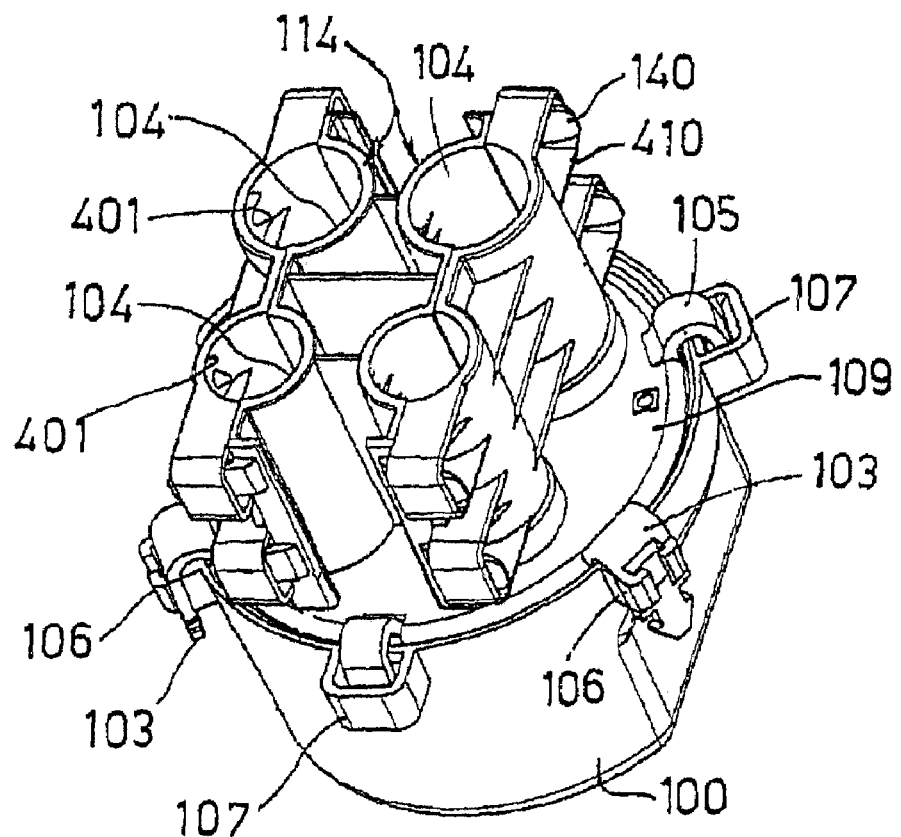
FIG. 22 is a perspective view of a casing for electric connections according to yet another embodiment of the present invention.
Figure 25:
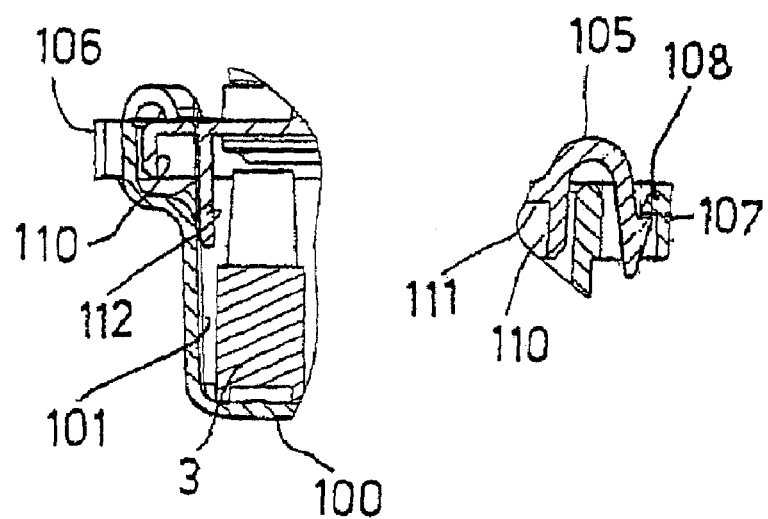
FIG. 25 is partial transverse section view of the base element of the casing shown in FIG. 22.
Figure 24:
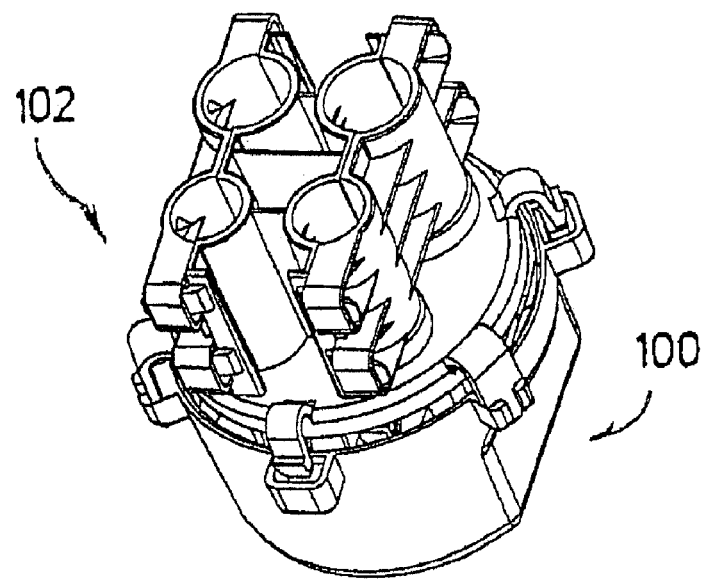
FIG. 24 is a perspective view of the casing shown in FIG. 22 in a step preceding the coupling of the upper element to the base element.
Figure 23:
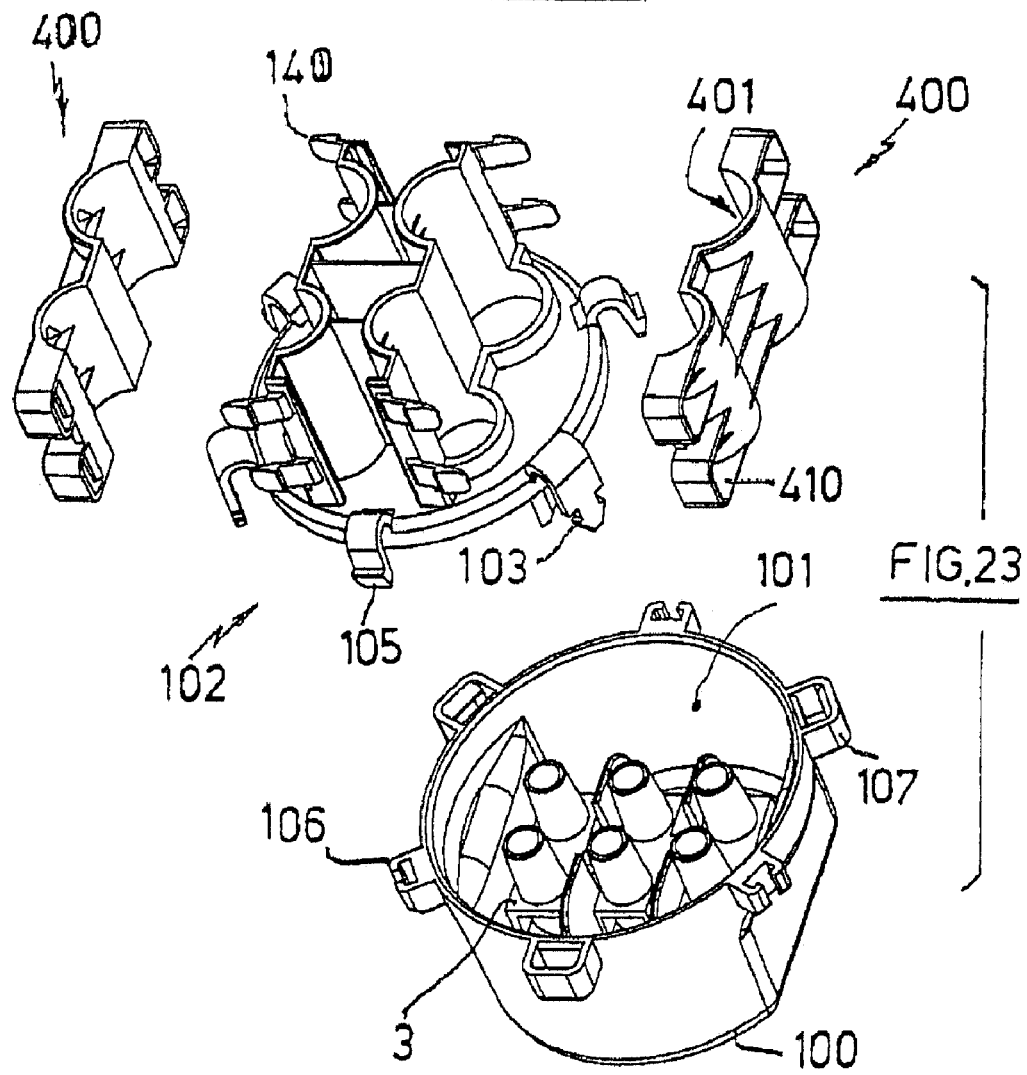
FIG. 23 is an exploded perspective view of the casing of FIG. 22.
Figure 26:
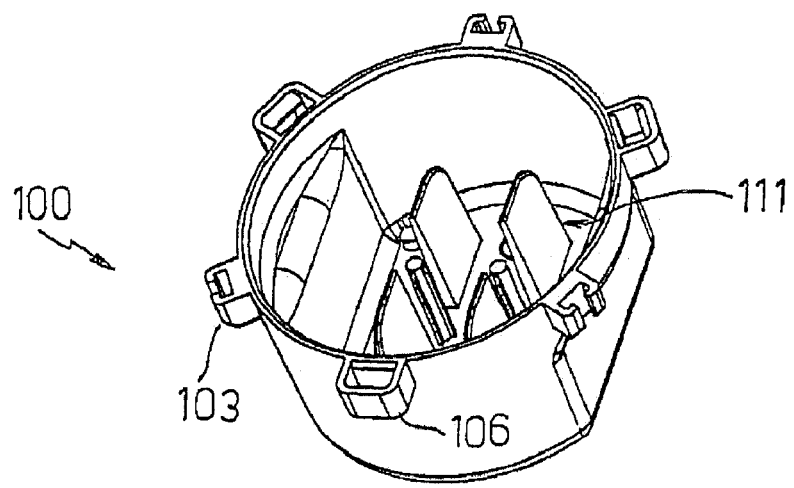
FIG. 26 is a perspective view of the base element of the casing shown in FIG. 22.
Figure 29:
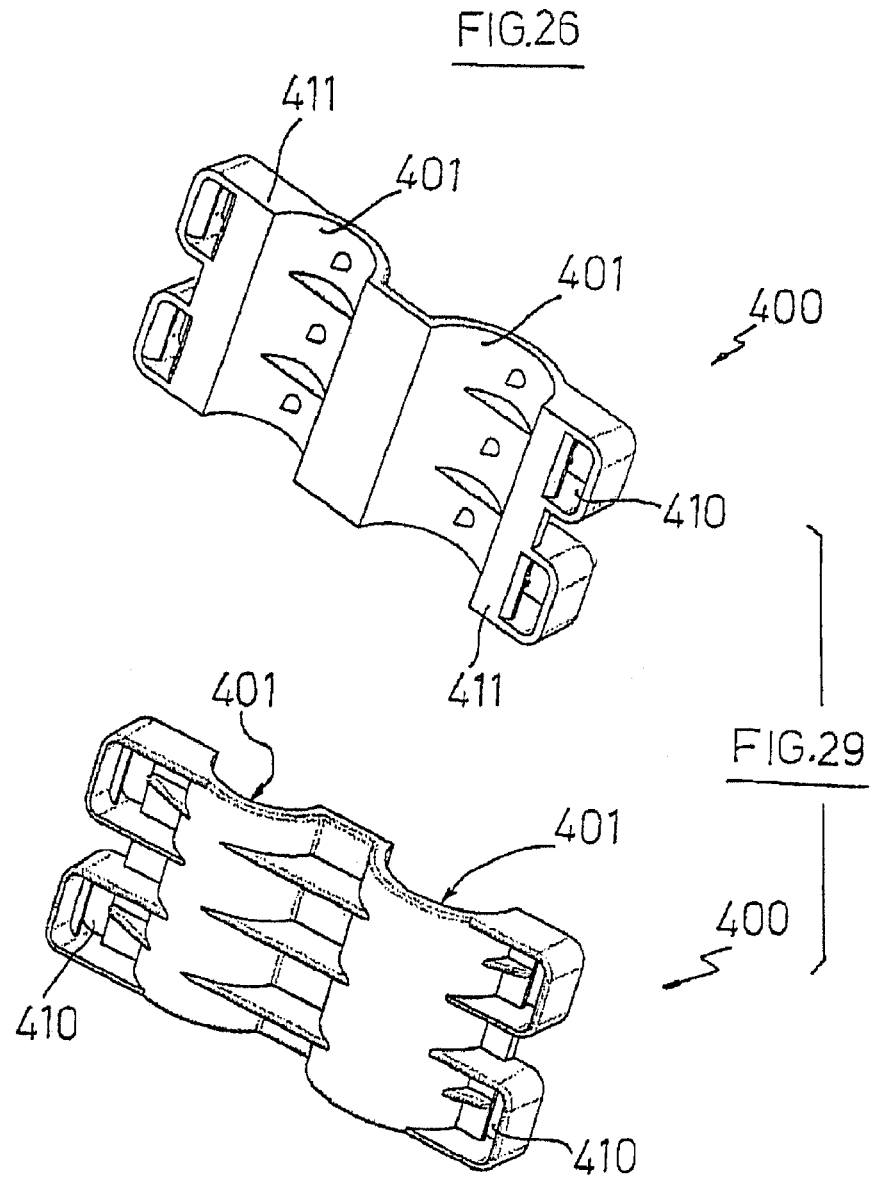
FIG. 29 is a perspective view of the cables clamping elements associated with the upper element of the casing shown in FIG. 22.
Figure 27:
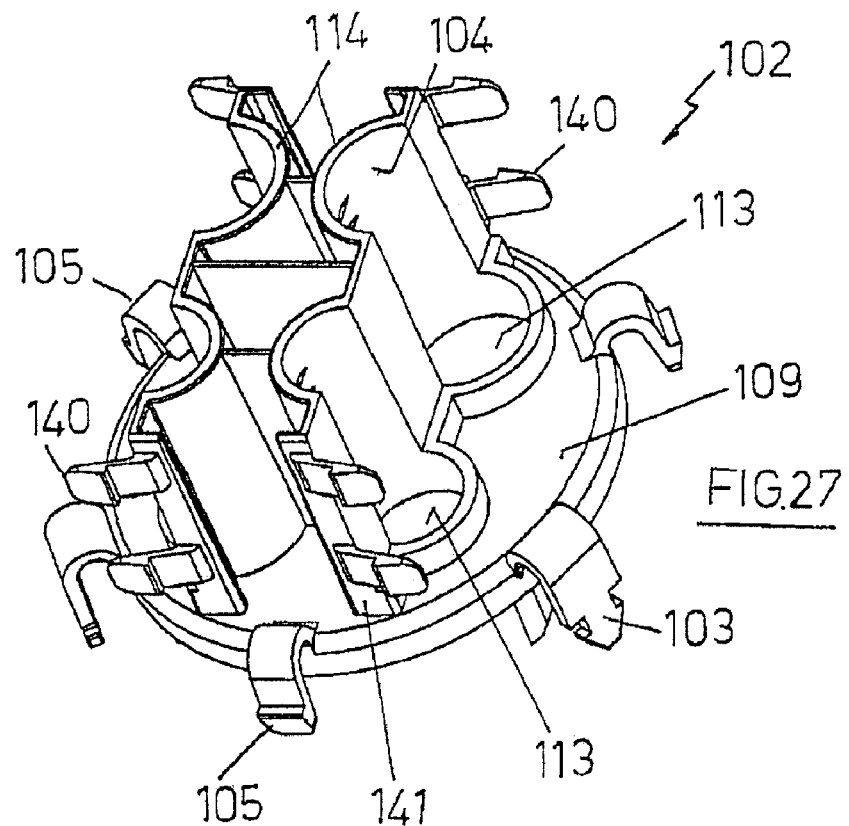
FIG. 27 is a perspective top view of the upper element of the casing shown in FIG. 22.
Figure 28:
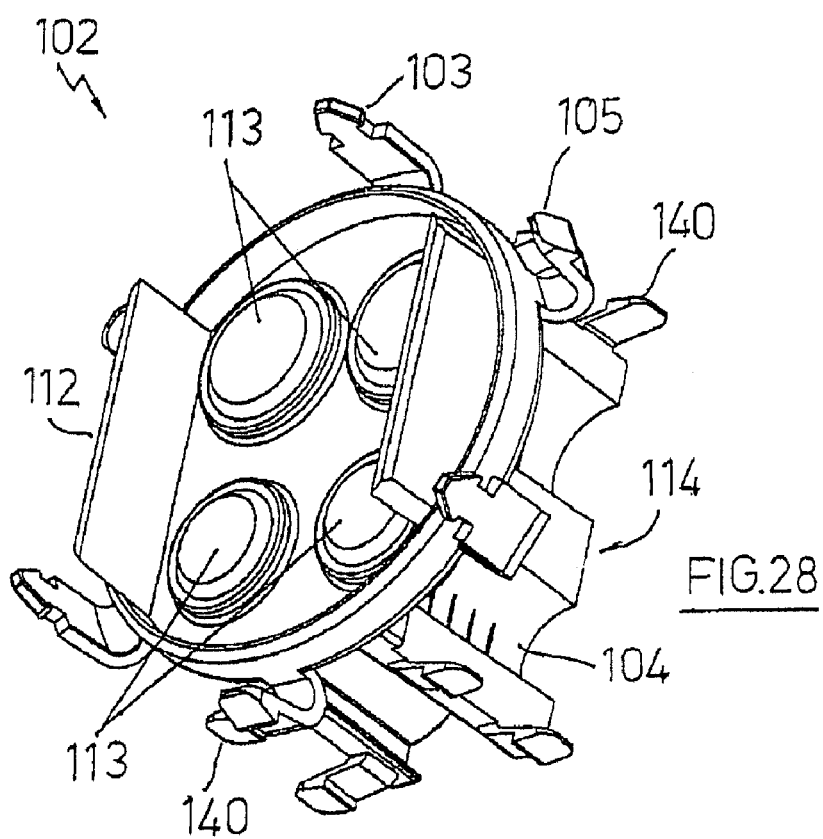
FIG. 28 is a perspective bottom view of the upper element of the casing shown in FIG. 22.
Figure 34:
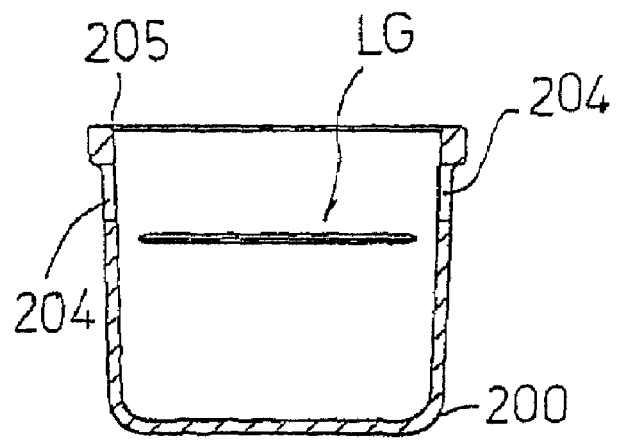
FIG. 34 is a vertical section view of the base element of the casing shown in FIG. 30.
Figure 36:
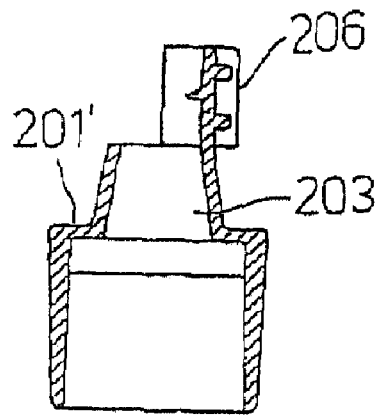
FIGS. 36 and 37 are two vertical section views of the element shown in FIG. 35.
Figure 37:
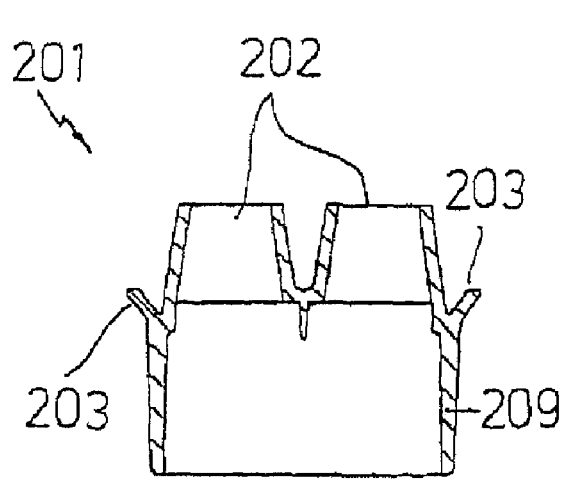
Figure 35:
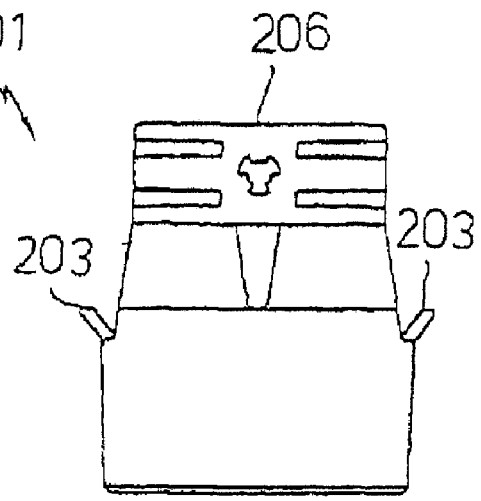
FIG. 35 is a front view of the upper element of the casing shown in FIG. 30.

More particularly, with reference to the diagram of FIG. 20, a process for manufacturing a casing according to the invention comprises the following operating steps:

moulding (S) of a half shell of plastic material provided with a depression (10) delimiting a housing for a terminal box (3) or a similar device for connecting a plurality of electrical conductors and one or more depressions (40) delimiting corresponding channel-shaped holes (4) for said conductors, being said depressions (10,40) in communication with one another;

transportation of said half shells along an orientation and vibration line (VO) from said moulding station (S) to a station (R) in which said depressions (10,40) are filled with a gelling liquid agent;

transportation (T) of half shells (1,1') from said filling station (R) to a station (P) in which the agent used for filling said depressions (10,40) is gelled.

Advantageously, after the gel (G) has formed in said station (P), it is provided a transport step (TS) of the half shells from the gelling station (P) to a station (AP) in which a film (not shown in the drawings) is applied for protecting the gel (G). The presence of heads (41) gives the possibility of filling the internal space of half shells (1,1') up to the level of edge (67) so as to prevent the not yet polymerized gel from brimming over during the transportation of the half shells from filling station (R) to polymerization or gelling station (P).

The device described above can be used as follows. Once the cables have been connected (5) by means of terminal box (3), as shown in FIG. 2, the electrician removes the film eventually applied on half shell (1) to protect gel (G) and introduces terminal box (3) into depression (10) of the half shell itself. During this operation, the presence of guides (11) emerging from the bottom of depression (10) facilitates the technician's work. Moreover, during this operation, the technician exerts a pressure with his fingers on terminal box (3) to overcome the resistance offered by gel (G) and, after removing heads (41) of the half shell, he positions the cables so that their respective sheaths are housed in depressions (40). Afterwards, the technician takes another half shell (1') and, after removing the gel-protective film eventually applied and the corresponding heads (41), he couples it to the previous one (1). As a consequence, the terminal box (3) is completely surrounded by gel (G) in the cavity (2) delimited by depressions (10) of half shells (1,1'). Moreover, gel (G) also completely surrounds and isolates the channel-shaped holes (4) delimited by the depressions (40). Said channel-shaped holes (4) constitute a plurality of inlets and outlets for the cables (5), which are also partially usable: if, for example, casing (1,1') exhibit four channel-shaped holes (4) as shown in the enclosed drawings, but cables (5) are three, as shown in FIG. 19, one of the channel holes (4) is not used and it is possible to avoid removing heads (41) of corresponding depressions (40).

The inclination of ramps (43) adjacent to depression (10) facilitates the positioning of cables (5) in proximity to terminal box (3) and reduces the consumption of gel.

Raised edges (65) in cooperation with extensions (68), during the coupling of half shells (1,1') constitute a barrier which prevents a lateral leakage of gel (G) from the casing and forces gel (G) itself to move towards the channel-shaped holes (4) so as to contribute to their further sealing.

Figure 19:
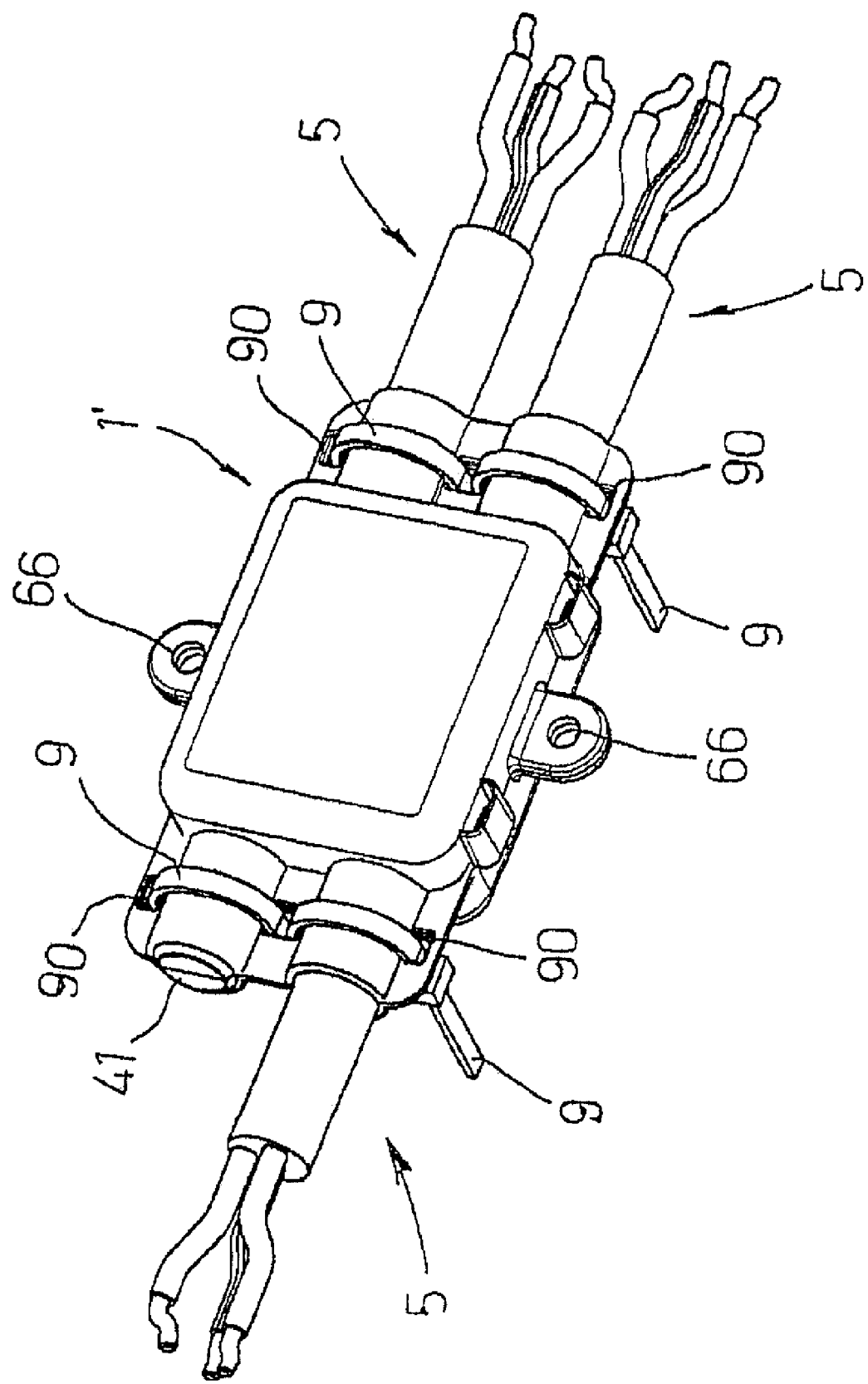
FIG. 19 is a perspective view of a casing for electric connections according to a further embodiment of the present invention.

A simplified version of the present casing is shown in FIG. 19: the coupling of half shells (1,1') is simply obtained by means of bands (9) passing though corresponding holes (90) provided in the wings (42) of half shells (1,1').

Each of said half shells (1,1') can feature two opposite lateral eyelets (66) by means of which the casing can be attached to a fixed holder by using screwing means or the like or it can be suspended by using a cord passing through the eyelets themselves. With reference to the example shown in FIGS. 22-29 of the enclosed drawing, the casing subject of the present invention consists of two elements having a different structure instead of two identical elements. More particularly, this casing comprises a base body (100) with an internal housing (101) for the terminal box (3) and an upper element (102) which constitutes a cover element of said housing (101) and is provided with a plurality of extensions (114) orthogonal to its upper face. Said extensions (114) are provided with channel-shaped depressions (104). Said depressions, in cooperation with corresponding depressions featured by the element (400) described below, delimit corresponding tubular guides for the cables connected to the terminal box (3). Like in the two previous examples, the internal bottom of base element (101) features a plurality of extensions (111) which emerge perpendicularly from the bottom itself and act as guides for the positioning of the terminal box (3). Said elements (100) and (102) are provided with means for their reciprocal coupling. In particular, said coupling means consist of a first series of flexible tongues (103) having the shape of a reversed "J" whose base is in proximity to a peripheral edge of the upper or external face of the element (102) and of a second series of flexible tongues (105) having the shape of a reversed "J" with a hooked free end, the base thereof being in proximity to the edge of element (102) from which the tongues (103) of the first series emerge. Moreover, said coupling means comprise a first and of a second series of eyelets (106,107) with vertical openings provided by the base element (100) in proximity to the upper edge of its external wall. The tongues (103) of the first series of tongues are inserted in the eyelets (106) of the first series of eyelets and the tongues (105) of the second series of tongues are inserted in the eyelets (107) of the second series of eyelets. Each eyelet (107) of the second series of eyelets features a surface (108) which partially develops inside the eyelet itself and constitutes a guide element for the hooked part of corresponding tongue (105). A lower horizontal portion of said surface (108) constitutes a contrast element for said hooked part of tongue (105) and a holding element of the tongue itself when the device is assembled.

The element (102) features an edge (110) having a predetermined height on its internal face (111), that is to say on the face which is opposite to the face (109) from which tongues (103) and (105) emerge. The face (111) of the element (102) is provided with two diametrically opposed flat extensions (112), which are orthogonal to the surface of the face (111) from which they emerge. Said extensions (112) are positioned more internally and are longer than said edge (110).

Both faces (109,111) of element (102) are provided with a plurality of removable portions (113) in correspondence of the above mentioned extensions (114). The removal of one or more said removable portions (113)—this operation can be carried out by means of a tool such as a screwdriver or similar tool—provides corresponding in/out openings for the cables connected to the terminal box (3).

Corresponding complementary elements (400) are hooked on said extensions (114) and each of them features channel-shaped cavities (401) corresponding to those (104) provided by extensions (114). In the example illustrated in FIGS. 22-30, said extensions (114) are four. Accordingly, each complementary element consists of a body with two hollow section cavities (401) positioned side by side, each of them being positioned in front of a corresponding extension (114) of element (102) when the casing is assembled. The connection of elements (400) to extensions (114) of element (102), so as to allow each cavity (104) of extensions (114) to be positioned opposite to a corresponding cavity (401) of an element (400), provides the above mentioned in/out tubular guides for the cables connected to terminal box (3).

Said extensions (114) of element (102) and complementary elements (400) are provided with means for their reciprocal coupling. Said means comprise a plurality of hooked tongues (140) which orthogonally project from the two longitudinal external edges (141) of said extensions (114) and a plurality of corresponding eyelets (410) featured by each element (400) at its external longitudinal edges (411). The coupling is carried out by introducing each tongue (140) into the corresponding eyelet (410).

In the case of the example illustrated in FIGS. 22-29, only the base element (100) is filled with dielectric gel. The positioning of terminal box (3) inside cavity (101) filled with gel and the subsequent coupling of element (102) to base (100) determines a flow of gel which covers the whole terminal box, that is to say the connections between the terminal box and the cables which are joined to it, and penetrates the in/out guides of the cables so as to render the connections perfectly sealed. Reference being made to the example shown in FIGS. 30-41, a casing for electric connections according to the present invention comprises a base element (200) and an upper element or cover (201). The base (200) accommodates the terminal box (3) to which the cables (5) are connected and is filled with dielectric gel (G) up to a predetermined level (LG). The cover element (201) is provided, on its top surface (201'), with a plurality of funnel-shaped in/out openings (202) for the passage of the cables (5), the larger base of said openings (202) being oriented towards the internal bottom of the base (200) when the casing is assembled. Moreover, the cover element (201) is provided with a diagonally and upwardly, i.e. centrifugally, oriented fin (203) on both external sides, said fins (203) being located in proximity of the lower end of said openings (202). The free end of each fin (203) is intended to engage a corresponding hole (204) provided by the base element (200) in proximity of its top edge (205). The fins (203) make it possible to realize an irreversible coupling of the cover element (201) to the base (200). The cover element (201) is provided with side walls (209) developing below said fins (203) and intended to be positioned within the cavity (210) delimited by the side walls and the bottom of the base element (200). The cover element (201) is further provided, positioned on top and laterally of said funnel-shaped openings (202), with an appendix (206) cooperating with a detachable complementary element (207) to clamp the cables (5) exiting from the openings (203) once, as further described below, the casing assembling is completed. This casing is assembled as shown in FIGS. 38-41. First, the cables (5) connected to the terminal box (3) are inserted through the openings (202) of the cover element (201) and the terminal box is housed within the space delimited by the side walls (209) of the cover element (201), the top surface (300) of the terminal box (3) being oriented towards the external. Then, the side walls (209) of the cover (201) are inserted into the base element (200) which is pre-filled with the dielectric gel (G) up to the engagement of the fins (203) of the cover (201) into the openings (204) of the base (200). During said insertion, the dielectric gel flows through any available space and completely seals the electric connections. The terminal box (3) results positioned with its top surface (300) oriented towards the internal bottom of the base element (200). Finally, the cables (5) exiting from the openings (202) of the cover element (201) are clamped by said appendix (206) and said complementary element (207) which are joined together, on opposite sides with respect to the cables (5), by means of a screw (208).

Practically, all the construction details may vary in any equivalent way as far as the shape, dimensions, elements disposition, nature of the used materials are concerned, without nevertheless departing from the scope of the adopted solution idea and, thereby, remaining within the limits of the protection granted to the present patent.

The invention claimed is:

1. A casing for electric connections comprising:
two elements which can be reciprocally coupled in a reversible or irreversible manner, each element having a shape of a half shell, said elements defining an internal cavity for a terminal box or similar device and a plurality of in/out openings for one or more cables which can be connected to the terminal box or similar device, wherein an internal space defined by at least one of said elements is filled with dielectric gel which occupies said space before the positioning of the terminal box or similar device into said cavity, each of said half shells having a central depression and a plurality of semi-cylindrical depressions, each semi-cylindrical depression being in communication with said central depression, one central depression of one half shell and another central depression of another half shell delimiting said cavity when one half shell is coupled to another half shell, one pair of semi-cylindrical depressions of one half shell and another pair of semi-cylindrical depressions of another half shell defining a plurality of channel-shaped holes for receiving the cables connected to said terminal box or similar device when one half shell is coupled to another half shell.

2. Casing according to claim 1, wherein said half shells are identical to each other.

3. Casing according to claim 1, wherein said gel is hot polymerized.

4. Casing according to claim 1, wherein said elements have a means for irreversible coupling.

5. Casing according to claim 1, wherein further comprising a base element having an internal volume filled with dielectric gel and a covering element associated with said base element.

6. Casing according to claim 5, wherein a plurality of in/out tubular guides for the cables connected to the terminal box (3) are formed on said covering element.

7. A casing for electric connections comprising:
two elements which can be reciprocally coupled in a reversible or irreversible manner, each element having a shape of a half shell, said elements defining an internal cavity for receiving a terminal box or similar device and a plurality of in/out openings for one or more cables which can be connected to the terminal box or similar device, wherein an internal space defined by at least one of said elements is filled with dielectric gel which occupies said space before the positioning of the terminal box or similar device into said cavity, each of said half shells having a central depression and a plurality of semi-cylindrical depressions, each semi-cylindrical depression being in communication with said central depression, one central depression of one half shell and another central depression of another half shell delimiting said cavity when one half shell is coupled to another half shell, one pair of semi-cylindrical depressions of one half shell and another pair of semi-cylindrical depressions of another half shell defining a plurality of channel-shaped holes for receiving the cables connected to said terminal box or similar device when one half shell is coupled to another half shell, wherein a means for holding the cables connected to the terminal box or similar device is located within at least one of said channel-shaped holes.

8. A casing for electric connections comprising:
two elements which can be reciprocally coupled in a reversible or irreversible manner, each element having a shape of a half shell, said elements defining an internal cavity for receiving a terminal box or similar device and a plurality of in/out openings for one or more cables connected to the terminal box or similar device when one element is coupled to another element, wherein an internal space defined by at least one of said elements is filled with dielectric gel which occupies said space before the positioning of the terminal box or similar device into said cavity, each of said half shells having a central depression and a plurality of semi-cylindrical depressions, each semi-cylindrical depression being in communication with said central depression, one central depression of one half shell and another central depression of another half shell delimiting said cavity when one half shell is coupled to another half shell, one pair of semi-cylindrical depressions of one half shell and another pair of semi-cylindrical depressions of another half shell defining a plurality of channel-shaped holes for receiving the cables connected to said terminal box or similar device when one half shell is coupled to another half shell, wherein said central depression is connected to each semi-cylindrical depressions via a ramp extending from each semi-cylindrical depression to said central depression.

9. A casing for electric connections comprising:
two elements which can be reciprocally coupled in a reversible or irreversible manner, each element having a shape of a half shell, said elements defining an internal cavity for a terminal box or similar device and a plurality of in/out openings for one or more cables which can be connected to the terminal box or similar device when one element is connected to another element, wherein an internal space defined by at least one of said elements is filled with dielectric gel which occupies said space before the positioning of the terminal box or similar device into said cavity, each of said half shells having a central depression and a plurality of semi-cylindrical depressions, each semi-cylindrical depression being in communication with said central depression, one central depression of one half shell and another central depression of another half shell delimiting said cavity when one half shell is coupled to another half shell, one pair of semi-cylindrical depressions of one half shell and another pair of semi-cylindrical depressions of another half shell defining a plurality of channel-shaped holes for receiving the cables connected to said terminal box or similar device when one half shell is coupled to another half shell, wherein said semi-cylindrical depressions are provided with removable ends or heads.

10. A casing for electric connections comprising:
two elements which can be reciprocally coupled in a reversible or irreversible manner, each element having a shape of a half shell, said elements defining an internal cavity for a terminal box or similar device and a plurality of in/out openings for one or more cables which can be connected to the terminal box or similar device, wherein an internal space defined by at least one of said elements is filled with dielectric gel which occupies said space before the positioning of the terminal box or similar device into said cavity, each of said half shells having a central depression and a plurality of semi-cylindrical depressions, each semi-cylindrical depression being in communication with said central depression, one central depression of one half shell and another central depression of another half shell delimiting said cavity when one half shell is coupled to another half shell, one pair of semi-cylindrical depressions of one half shell and another pair of semi-cylindrical depressions of another half shell defining a plurality of channel-shaped holes for receiving the cables connected to said terminal box or similar device when one half shell is coupled to another half shell;

a base element having an internal volume filled with dielectric gel and a covering element.

11. A casing for electric connections comprising:

two elements which can be reciprocally coupled in a reversible or irreversible manner, each element having a shape of a half shell, said elements defining an internal cavity for a terminal box or similar device and a plurality of in/out openings for one or more cables which can be connected to the terminal box or similar device, wherein an internal space defined by at least one of said elements is filled with dielectric gel which occupies said space before the positioning of the terminal box or similar device into said cavity, each of said half shells having a central depression and a plurality of semi-cylindrical depressions, each semi-cylindrical depression being in communication with said central depression, one central depression of one half shell and another central depression of another half shell delimiting said cavity when one half shell is coupled to another half shell, one pair of semi-cylindrical depressions of one half shell and another pair of semi-cylindrical depressions of another half shell defining a plurality of channel-shaped holes for receiving the cables connected to said terminal box or similar device when one half shell is coupled to another half shell;

a base element having an internal volume filled with dielectric gel and a covering element, wherein a plurality of in/out tubular guides for the cables connected to the terminal box are formed on said covering element.

* * * * *